Patented Nov. 2, 1943

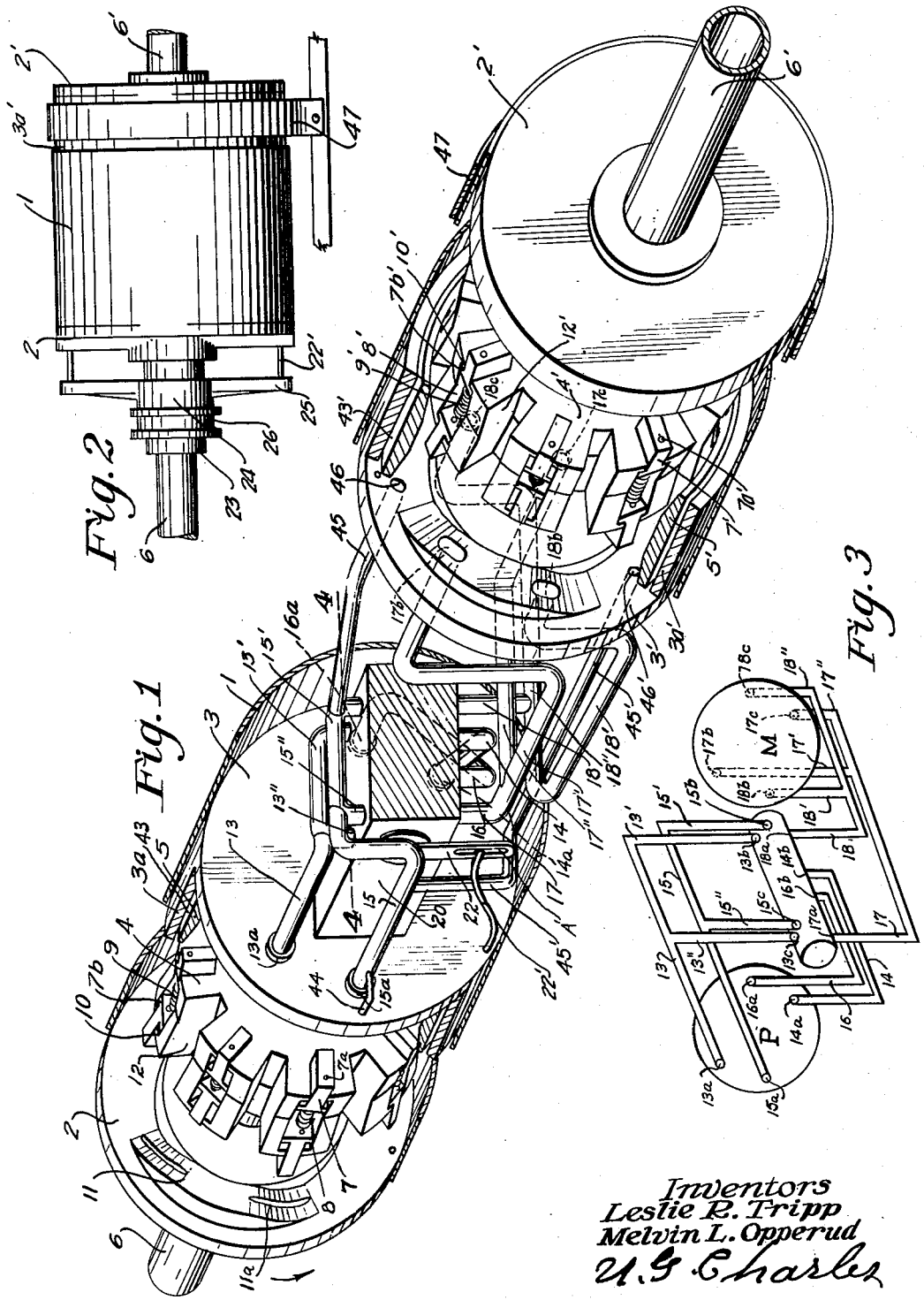

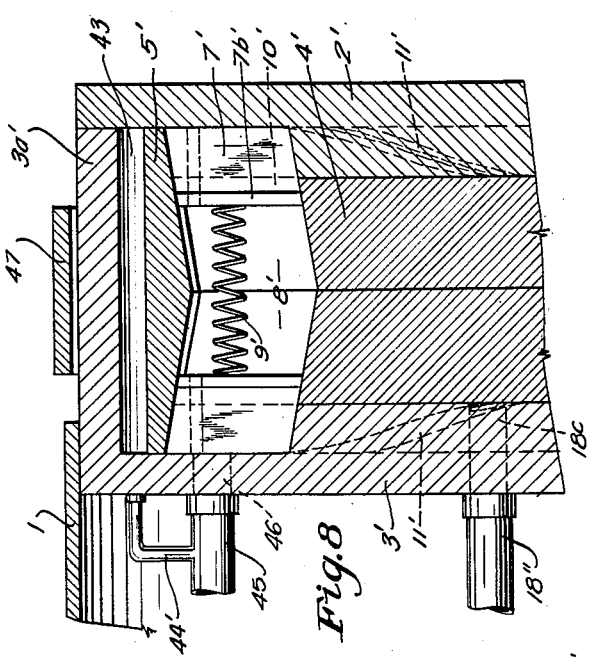

2,333,620

UNITED STATES PATENT OFFICE 2,333,620

HYDRAULIC TRANSMISSION

Leslie R. Tripp and Melvin L. Opperud, Blackwell, Okla., assignors of one-eighth to U. G. Charles and Fred J. Mehl, both of Wichita, Kans.

Substituted for abandoned application Serial No. 484,834, September 27, 1930. This application February 3, 1941, Serial No. 377,236

1 Claim. (Cl. 60—53)

Our invention relates to improvements in a hydraulic transmission, and this application is a substitute for abandoned application Ser. No. 484,834, filed September 27, 1930.

The object of our invention is to provide a hydraulic transmission composed of members designed to minimize the retarding action due to centrifugal force, but at the same time to use this force to increase the efficiency of the device.

A further object of our invention is to provide a hydraulic transmission comprised of a plurality of circulatory systems, each system thereof accommodating the transmission for a different action between the driving member and the driven member.

A still further object of our invention is to provide a pump mechanism for the purpose of creating a pressure on the fluid contained within the device, this pressure being directed into a motor mechanism through any one of a number of different routes, as a means of adapting the transmission to various desired speed ratios, and means for controlling the circulation of the fluid.

A still further object of our invention is to provide a rockable cylindrical valve trunnioned within the transmission housing with which to control the flow of fluid through the transmission, said valve directing the circulation thereof in any one of a plurality of different routes, each route corresponding to a distinct relative motion between the drive shaft and the driven shaft, said valve also arresting the flow of fluid as means for causing another relative motion between the moving members.

A still further object of our invention is to provide a hydraulic transmission designed to equalize the fluid pressures on the opposite ends of the rotors, and to thus minimize loss of power by eliminating end thrusts on the rotors.

A still further object of our invention is to provide a rotor member with radial impellers slidably positioned in grooves therearound, and a shroud band snugly engaging with the rotor around the periphery thereof, and rotating therewith as the mechanism operates, providing a means for reducing friction between the impellers and the housing.

A still further object of our invention is to provide a shroud band for enclosing the rotors of the mechanism, said band having an angular convexity on the inner surface thereof which acts as a guide for the reciprocative movement of the impeller members of the device, the outwardly sloping faces of the shroud band aiding the impellers to return to their protruded positions, due to centrifugal force when the device is in operation.

A still further object of our invention is to provide a rockable cylindrical valve trunnioned within the transmission housing for the purpose of controlling the action of the said transmission, said valve rockable through the medium of a lever and serving as a control means for the transmission.

These and other objects will hereinafter be more fully explained, reference being had to the accompanying drawings which form a part of this specification, and in which like characters will apply to like parts in the different views.

Referring to the drawings:

Fig. 1 is an exploded perspective view of the hydraulic transmission, the outer casing removed, and the various members being spaced far apart for convenience of illustration.

Fig. 2 is a side elevation of the device assembled.

Fig. 3 is a schematic view arranged for illustrating the various circulatory systems of the transmission.

Fig. 4 is a sectional view through the valve and its adjoining members, taken on line 4—4 in Fig. 1, the valve as shown illustrating the position thereof when the transmission is in neutral.

Fig. 5 is a sectional view taken on line 4—4 in Fig. 1, showing the valve in intermediate position.

Fig. 6 shows a sectional view taken on line 6—6 in Fig. 4.

Fig. 7 is a view of the valve, shown broken in half so that both ends thereof may be seen in perspective, sections of these ends being cut away to show clearly the slots and apertures which compose the valve.

Fig. 8 is a sectional view through the upper side of the motor mechanism.

Fig. 9 is a view of the inside face of the end plate adjacent the motor.

Our invention herein described consists of a rotary pump driven by the drive shaft of the power system, a fluid motor similar in construction to the rotary pump, and at times driven by the pressure generated by said pump, and a valve as controlling means for the flow of fluid between the pump and motor. Since the parts comprising the pump and motor mechanisms are similar, we shall describe the construction of the former, giving the various parts thereof prime reference numbers, the corresponding members in the motor mechanism being designated by the same characters followed by the symbol '.

The working mechanism of our invention is enclosed within a cylindrical shell 1, the ends thereof being formed by circular plates 2 and 2'. The flange 3a of the peripherally flanged plate 3 engages snugly against plate 2, forming a fluid-tight working chamber within which the pump operates. Said pump consists of a rotor 4 concentrically positioned within the shell 1 and circumferentially surrounded by shroud band 5, said band snugly but slidably engaging against end plate 2 and flange plate 3. Rotor 4 is integrally connected with a drive shaft 6 extending through an aperture in end plate 2; pairs of T shaped impellers 7 are positioned in alternate radially extending grooves 8 in said rotor, the respective pairs of impellers being tensioned outwardly by springs 9 and being stopped at the extremity of their outward movement by the engagement of crossarms 7b with the lugs 10 integrally connected to the rotor and extending into the grooves as shown. On each of the inside faces of plates 2 and 3, and projecting into the working chamber of the pump, are a pair of diametrically spaced abutments or deflectors 11, which function as follows:

When the pump mechanism is in readiness for operation, the working chamber will be filled with fluid of desired viscosity, to allow proper functioning of the moving members. As the drive shaft turns, operated by the impelling force of the system, its integrally connected rotor 4 will likewise rotate. Referring to Fig. 8, it will be noted that rotor 4 engages against the faces of deflectors 11, and the peripheral edge of said rotor and the T-shaped impellers 7 engage the shroud band 5. The fluid, therefore, will be contained between the faces of the rotor and the plates 2 and 3, and also in grooves 12 radially positioned in the rotor alternately to impeller grooves 8. When the rotor turns, the pairs of impellers will be retracted into the grooves 8 by their passage over deflectors 11, and the volume between the adjacent pairs of impellers will be decreased, pressure will be set up in the fluid contained therebetween, and unless it escapes from the working chamber the transmission will become locked, and driven shaft will tend to rotate with the same speed as the drive shaft. A tubular arrangement as shown in Figs. 1 and 3 will convey the fluid from the pressure chambers of the pump, and return it to other sections of the working chamber.

An elongated aperture is positioned at the end of the upward incline of each of the deflectors mounted on the flange plates 3 and 3', i. e., when the rotor turns as shown by the arrow in Fig. 1, and the impellers are caused to retract into their respective grooves, apertures 13a and 14a lying at points opposite the deflectors where the retraction of the impellers begins to take place. These ports are outlet means for the fluid from the pump. Ports 15a and 16a lie at points on the deflectors where the expansion of volume between adjacent impellers commences to occur, and are therefore inlet ports for the pump.

Apertures 7a will be noted extending longitudinally through impellers 7. The apertures are so placed to allow the fluid to freely flow into and from groove 8 as the impellers reciprocate, actuated inwardly by deflectors 11 and outwardly by springs 9. It will be understood that as the impellers slide over the sloping faces of the deflectors, the entire outer surfaces of the impellers will not contact with the deflectors, but the line of contact therebetween will be one corner of the impeller face against the deflector face, thus leaving aperture 7a free to draw in or expel fluid.

Referring to Fig. 1, grooves 11a on the sloping faces of the deflectors 11 are arranged to prevent a back pressure caused by the fluid after an impeller has passed an intake port. Grooves 11a must be positioned in both sloping faces of the deflectors integral with the end plates 2 and 2'.

When the pump and motor are rotating at a high rate of speed, and impellers 7 are reciprocating in their respective grooves, the centrifugal force set up by the rotative motion offers a resistance to the outward pressure of the springs 9, and impairs the proper functioning of the impellers. To overcome this difficulty, we have arranged the peripheral face of both the motor and pump rotors with an angular concavity, and the inner face of the shroud band 5 with an angular convexity of equal angularity. Thus as shown clearly in Fig. 8, the outward reciprocative movement of the impellers longitudinally to the transmission system will have a component away from the axis thereof. The centrifugal force will now serve to separate the impellers more readily, and the action of these important members of our transmission will be nearer perfect than if the movement thereof were in parallelism with the longitudinal axis of the mechanism.

We have now shown the construction of the pump mechanism. As explained, the motor is of the same construction, so further explanation is needless.

The arrangement of the conveying tubes to and from the valve will be noted in Figs. 1 and 3.

Tube 13 extends from outlet port 13a and branches into bifurcations 13' and 13" to the upper side of the valve box 20, 13' connecting with 13b and 13" with 13c.

Tube 15 connects inlet port 15a through bifurcations 15' and 15" to ports 15b and 15c respectively on the upper side of the valve box.

Tube 16 connects the pump inlet port 16a with one of the center valve ports 16b on the lower side of the valve box.

Tube 14 extends from outlet port 14a to the remaining lower center valve box port 14b.

Bifurcated tube 17 extends from the lower valve box port 17a adjacent port 16b to ports 17b and 17c of the motor, 17' and 17" being the bifurcations, respectively.

Branches 18' and 18" of the bifurcated tube 18 connect port 18a adjacent 14b on the lower side of the valve box to motor ports 18b and 18c, respectively.

The arrangement of the ports connecting the conveying tubes with the valve will be noted. Into the upper side of the valve box engage the bifurcated tubes 13 and 15 in parallelism with one another and longitudinally to valve 19, two adjacent pairs of ports being formed thereby; 13b and 15b at one end of the valve, and 13c and 15c at the opposite end thereof. The ports on the lower side of the box are arranged in alignment as shown in Figs. 4, 5, and 6.

It is desired to procure a variance of speed of rotation for the driven shaft with a constant speed of the drive shaft. This may be accomplished by allowing more or less fluid to flow through the motor mechanism under the pressure generated by the pump. The valve mechanism is designed to provide plurality of circulatory systems, each of which causes a different amount of fluid to flow through the motor.

Valve 19 is of cylindrical form and rests within a valve seat in a neck member 20 which is integrally connected to flanged plates 3 and 3'. Spindles or stems 21 mounted on bearings 21' extend from each end of the valve through apertures in the walls of the neck chamber or valve box 20 where said stems connect with arms 22. These arms are slotted on the lower end thereof as at A' (Fig. 1) to receive a rod member 22' slidably engaging through the apertures in the end plate 2 and flange 3a, extending outwardly, as shown in Fig. 2, from the end of the enclosing shell for the transmission. On a bearing 23 which is rigidly connected with end plate 2 is slidably arranged a sleeve 24 having a circumferential groove 26 adapted to receive means for moving said sleeve, and thereby said connected arms and said rod members are moved inwardly and outwardly with respect to the enclosing shell. By this movement arms 22 engaging with valve 19 will rock, and the valve rotated in its seat.

As shown in Figs. 4 and 6, the valve is designed to cause neutral action in one certain position; reverse with a slight rotative movement in one direction; and low, intermediate and high respectively with rotation in the opposite direction. Slots, apertures, and cavities are arranged on the valve to allow the fluid to flow as desired. We shall describe the construction of the valve for the various speeds of the driven shaft, taking them in the order; neutral, low, reverse, intermediate, and high.

In relative motion of transmission systems known as neutral, in which the driven shaft has no motion while the drive shaft is rotating, it is desired that all fluid leaving the pump mechanism be returned to the working chamber of the pump without passing through the motor. This is accomplished by providing a cavity 27 in one end of the valve 19 and a similar cavity 28 in the opposite end thereof, cavity 27 being in the end engaging with tubes 13' and 15', and cavity 28 in the end engaging with 13" and 15". Now, fluid forced into the tubes 13 and 14 by the action of the impellers 7 passing over the deflectors 11, will flow into port 13b and 14b and will tend to be distributed through tubes 13' and 13" to ports 13b and 13c. However, port 13c is closed by a portion 29 of the valve, so that the fluid will flow through 13b into cavity 27. Port 18a is closed by a portion 30 of the valve, and port 15b is open by reason of aperture 31 therein. The fluid will flow into cavity 27 from 13', and return to pump inlet port 15a through aperture 31, port 15b and tube 15'. Ports 14b and 16b are connected by groove 32 in the valve, allowing fluid entering the valve through tube 14 to return to inlet port 16a via port 14b, groove 32, port 16b, and tube 16. Thus, although the pump mechanism is functioning to capacity, none of the fluid pumped thereby will pass through the motor; therefore no motion will be transferred from the drive shaft, and the transmission will function in neutral.

The relative motion known as low, in which the driven shaft is caused to turn with lowest ratio with respect to the drive shaft, is obtained by rotating the valve 19 slightly by means of arms 22 and their engaging members. For this condition, the ports 14b and 16b are connected, as in neutral, by the groove 32. Dam 30 covering port 18a is removed and aperture 33 leaves 18a unobstructed. Port 17a is clear due to aperture 34. A portion 35 of the valve will engage over the port 15b, closing that return to the pump. Dam 29 will continue to cover port 13c, but 15c will be clear by reason of aperture 36 in valve 19. Circulation will occur as follows: From port 13a through tubes 13 and 13' to port 13b, through aperture 31, cavity 27, through aperture 33 to port 18a, tubes 18, bifurcations 18' and 18" to ports 18b and 18c of the motor. After spending the energy contained within the fluid in rotating the impellers 7' and thereby the motor and its integrally connected driven shaft 6', the fluid will start its return flow to the pump through ports 17c and 17b, through tubes 17" and 17' to tube 17, and from there to port 17a and aperture 34 into cavity 28 of the valve, thence through 15c and tubes 15" and 15 to port 15a of the pump, completing the circulatory system. It is understood that the fluid pumped from the outlet port 14a through tube 14 will enter the valve at 14b, flow through groove 32 and return to the pump by way of port 16b, tube 16 and port 16a. Our low speed will therefore be caused by the rotation of the motor through the force exerted by the supply of fluid from one of the outlet ports in the pump; that is, one revolution will displace the fluid within the pump chambers.

Reverse may be accomplished by rotating the valve in the opposite direction from low. In this case groove 32 will continue to connect ports 14b and 16b of the valve; port 13b will be closed by portion 37 of the valve, but 15b will be clear by reason of slot 31; port 13c will open due to aperture 38, but 15c will be obstructed by 29; and both 17a and 18a are unobstructed due to apertures 34 and 40, respectively. Thus, in the reverse condition, the fluid will flow into the valve from the pump through port 13c instead of 13b as in low, and 17b and 17c will become the inlet ports of the motor. This will cause the motor to rotate in a direction opposite to that of the drive shaft, and will result in the relative motion known as reverse.

In intermediate, a speed greater than that of low, the circulation is the same as for low condition for the fluid flowing through the motor and return, however, groove 32 will have been rotated away from alignment with ports 14a and 16a and a pair of grooves 41 and 42 will assume said alignment. Grooves 41 and 42 extend outwardly from the center of the valve as shown in Fig. 5, and it will be seen that the fluid flowing into port 14b will follow groove 41 to port 18a and combine with the pumped supply from port 13b. Likewise fluid returning from the motor through tube 17 will be divided, one portion thereof flowing through port 15c and the other portion through groove 42 and port 16b, and return to the pump via tube 16 and aperture 16a. The intermediate speed circulatory system, therefore, will supply twice the quantity of fluid to the motor that the low system is capable of. Thus the speed of rotation of the driven shaft will be doubled by the rerouting of the second outlet supply of the pump. In this case, the fluid in the pump chambers is displaced by one half revolution of the pump rotor.

In high speed, the speed ratio in which the drive shaft transmits substantially all of its speed to the driven shaft, the valve will rotate a slight ways further beyond intermediate position, both of the ports connecting the valve with the pump will be obstructed by the walls of the valve, the fluid contained in the system cannot circulate, and will act as a rigid connecting means between the drive shaft and the driven shaft, adapting the transmission to the condition known as high.

In order to obtain three different speeds, the motor end may have a greater capacity than the pump end, which may be accomplished by increasing the depth of cam means 11' and length of the impellers 7', the variations not being illustrated in the drawings.

To insure that the working chambers of both the motor and pump are filled to capacity at all times, reservoirs 43 and 43' are positioned concentrically around their respective mechanisms in the space between the shroud bands 5 and 5' and the flanges 3a and 3a', respectively. From these reservoirs extend small tubes 44 and 44', 44 engaging into tube 15, and 44' with larger tubes 45 and 45', the latter adjoining with conveying tubes 15' and 15 respectively. These tubes 45 and 45' are positioned as shown in Fig. 1 connected with apertures 46 and 46' between adjacent deflectors for the purpose of exhausting any unequal pressure which may accumulate between the impellers, the existance of which pressure might cause a retarding action to the mechanism.

Due to the reaction of the rotating mechanism when the motor is caused to operate, the shell will turn. As a means of preventing this action, a brake band 47 is positioned concentrically about flange plate 2', this is drawn to engagement with said flange when the transmission is to act in low, intermediate, or reverse, and the difficulty is overcome.

The details of our invention as herein described may be changed in many ways without changing the general idea of the device. The controlling valve may be altered considerably, the impellers may be of different construction than that shown, in fact, the entire arrangement may be modified, without changing the invention, for which we claim as new and desire to secure by Letters Patent is:

In a hydraulic transmission, a pair of flanged plates integrally connected by a neck member and axially aligned, and the outer ends of each of the flanges being closed by another plate removably arranged and being apertured to receive a shaft rotatable therein respectively, the said flanged plates functioning as a housing, a rotatably arranged element positioned in each of the flanged plates, the said elements having similar means and to function as a motor or a pump, a rotatably arranged valve positioned in the neck, and means to rock the same reciprocatingly, a plurality of tubes as connecting means for the valve arrangement to the adjacent plates that are flanged, a shaft secured to each of the rotatably arranged members in axial alignment, one functioning as a drive shaft, the other as a driven shaft, and means to stationarily support the housing against rotation while the rotatable elements are in action.

LESLIE R. TRIPP.
MELVIN L. OPPERUD.